United States Patent
Grady (10) Patent No.: US 9,221,533 B1
(45) Date of Patent: Dec. 29, 2015

(54) REMOVABLE WINDOW SYSTEM FOR SPACE VEHICLES

(75) Inventor: James P. Grady, Irvine, CA (US)

(73) Assignee: THE BOEING COMPANY, Chicago, IL (US)

( * ) Notice: Subject to any disclaimer, the term of this patent is extended or adjusted under 35 U.S.C. 154(b) by 879 days.

(21) Appl. No.: 13/279,620

(22) Filed: Oct. 24, 2011

(51) Int. Cl.
*B64C 1/14* (2006.01)

(52) U.S. Cl.
CPC ............ *B64C 1/1492* (2013.01); *B64C 1/1484* (2013.01)

(58) Field of Classification Search
USPC ............... 244/158.1, 171.7, 129.3, 129.4; 296/146.1, 84.1; 248/208
See application file for complete search history.

(56) References Cited

U.S. PATENT DOCUMENTS

| | | | | |
|---|---|---|---|---|
| 5,271,581 | A * | 12/1993 | Irish | 244/129.3 |
| 6,938,858 | B1 * | 9/2005 | Schneider et al. | 244/158.3 |
| 8,079,185 | B2 * | 12/2011 | Paspirgilis | 52/204.62 |
| 8,297,556 | B2 * | 10/2012 | Krahn | 244/129.3 |
| 8,449,709 | B2 * | 5/2013 | Modin et al. | 156/245 |
| 8,544,798 | B2 * | 10/2013 | Eberth et al. | 244/129.3 |
| 8,695,923 | B2 * | 4/2014 | Eberth et al. | 244/129.3 |
| 8,714,487 | B2 * | 5/2014 | Yokoi | 244/129.3 |
| 2003/0234322 | A1 * | 12/2003 | Bladt et al. | 244/129.3 |
| 2008/0067288 | A1 * | 3/2008 | Eberth et al. | 244/129.3 |
| 2008/0217479 | A1 * | 9/2008 | Wood | 244/129.3 |
| 2008/0308677 | A1 * | 12/2008 | Kirchoff et al. | 244/129.3 |
| 2009/0084900 | A1 * | 4/2009 | Krahn | 244/129.3 |
| 2011/0186684 | A1 * | 8/2011 | Eberth et al. | 244/129.3 |
| 2012/0241559 | A1 * | 9/2012 | Ebner et al. | 244/129.3 |
| 2013/0062468 | A1 * | 3/2013 | Yokoi | 244/129.3 |

OTHER PUBLICATIONS

Leger et al., "Apollo Experience Report—Window Contamination," NASA Technical Note, Manned Spacecraft Center, Houston, TX, Mar. 1972, 17 pp.

* cited by examiner

*Primary Examiner* — Benjamin P Lee
(74) *Attorney, Agent, or Firm* — Yee & Associates, P.C.

(57) ABSTRACT

A window system for a platform comprising a window pane, a retention frame, and a biasing system. The window pane may be configured to contact a sealing system. The retention frame may be configured to contact the sealing system and hold the window pane against the support frame. The biasing system may be configured to bias the retention frame toward the support frame while the support frame and the retention frame are in a configuration that holds the window pane. Removal of the biasing system may cause the retention frame and the window pane to be removable.

14 Claims, 10 Drawing Sheets

REMOVABLE WINDOW SYSTEM FOR SPACE VEHICLES

GOVERNMENT LICENSE RIGHTS

This application was made in the performance of work under National Aeronautics and Space Administration (NASA) Contract No. NNK11MS035 and is subject to the provisions of Section 305 of the National Aeronautics and Space Act of 1958 (72 Stat. 435: 42 U.S.C. 2457.) The United States Government has certain rights in this application.

BACKGROUND INFORMATION

1. Field

The present disclosure relates generally to vehicles and, in particular, to space vehicles. Still more particularly, the present disclosure relates to a removable window system for a spacecraft.

2. Background

Spacecraft may have platforms designed for operation in outer space. A spacecraft may take various forms. For example, a spacecraft may be a space station, a space shuttle, a capsule, a space plane, and other platforms that may enter outer space.

Some spacecraft may be designed to repeatedly be launched into space and re-enter the atmosphere. These types of spacecraft may be subjected to temperatures that may reach over about 1,500 degrees Celsius when re-entering the atmosphere. Further, loads also may be placed on different structures of the spacecraft during re-entry as well as during launching of the vehicle into space.

These types of events may result in undesired inconsistencies in windows in a spacecraft. For example, without limitation, a window may not provide the optical clarity that may be desired for observing objects outside of the spacecraft. As a result, windows may be reworked or replaced after re-entry and landing on the earth. In another example, a window may not have a desired level of strength.

After a spacecraft has returned to Earth, spacecraft may be inspected to determine whether inconsistencies may be found on windows and/or other locations on the spacecraft. If inconsistencies are found in a window pane, the window pane may be replaced. Various components of the window system may be removed to reach the window pane, remove the window pane, and/or replace the window pane. These different components may then be reassembled. Inspecting and reworking windows may be more time consuming and costly than desired.

Therefore, it would be advantageous to have a method and apparatus that takes into account at least some of the issues discussed above as well as possibly other issues.

SUMMARY

In one advantageous embodiment, a window system for a platform may comprise a window pane, a retention frame, and a biasing system. The window pane may be configured to contact a sealing system. The retention frame may be configured to contact the sealing system and hold the window pane against the support frame. The biasing system may be configured to bias the retention frame toward the support frame while the support frame and the retention frame are in a configuration that holds the window pane. Removal of the biasing system may cause the retention frame and the window pane to be removable.

In another advantageous embodiment, a method for manipulating a window system in a platform is provided. A biasing system may be removed that biases a retention frame toward a support frame while the support frame and the retention frame hold a window pane. The retention frame may be removed after removing the biasing system. The window pane may be removed.

In yet another advantageous embodiment, a window system for a spacecraft may comprise a sealing system, a window pane to contact the sealing system, a support frame, a retention frame, a number of springs in a biasing system, and a structure for the spacecraft. A number of seals in the sealing system may comprise at least one of a number of thermal seals and a number of pressure seals. The support frame may be configured to contact the sealing system and support the window pane. The retention frame may have an L-shape with a base and a flange that extends from the base. The retention frame may be configured to contact the sealing system and hold the window pane against the support frame. At least one of the number of thermal seals and the number of pressure seals may be located between the window pane and the retention frame. The sealing system may be in contact with the window pane, the support frame, and the flange of the retention frame and may form a seal for the window pane. The number of springs in the biasing system may be configured to bias the retention frame toward the support frame while the support frame and the retention frame are in a configuration that holds the window pane. A first portion of the number of springs may be configured to contact the retention frame. A second portion of the number of springs may be configured to engage a channel in the support frame. Removal of the biasing system may cause the retention frame and the window pane to be removable. The support frame may be connected to the structure by a fastener system.

In yet another advantageous embodiment, a method for manipulating a window system in a spacecraft is provided. A thermal protection system may be removed from the window system. A number of springs in a biasing system may be removed that biases a retention frame toward a support frame while the support frame and the retention frame hold a window pane. The support frame may be connected to a structure for the spacecraft by a fastener system. The retention frame may be removed after removing the biasing system. The retention frame may have an L-shape with a base and a flange extending from the base. A sealing system in contact with the window pane may be removed after removing the retention frame. The sealing system in contact with the window pane, the support frame, and the retention frame may form a seal for the window pane. The window pane may be removed. A new window pane may be placed on the support frame. The sealing system may be replaced. The retention frame may be replaced. The biasing system may be replaced such that the retention frame and the support frame hold the new window pane. The thermal protection system may be replaced.

The features, functions, and advantages may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof will best be understood by reference to the following detailed description of an advantageous embodiment of the present disclosure when read in conjunction with the accompanying drawings, wherein:

DETAILED DESCRIPTION

The advantageous embodiments recognize and take into account one or more considerations. For example, without limitation, the advantageous embodiments recognize and take into account that replacing a window pane in a window system may take more time than desired. The number of parts that are removed and replaced in replacing a window pane or removing a window pane for rework may be numerous enough that the amount of time increases beyond what may be desired. Further, with the increased amount of time and labor needed, the cost for replacing window panes in a window system also may be greater than desired.

The different advantageous embodiments recognize and take into account that in currently used window systems, numerous fasteners may be removed to allow access to a window pane. For example, without limitation, a window system may have 60 or more fasteners that may be removed to remove a window pane. Further, these fasteners and/or new fasteners may be installed when the window pane is replaced after rework or a new window pane is placed into the window system.

Therefore, the different advantageous embodiments recognize and take into account that avoiding removal of fasteners in a fastener system may be desirable when removing a window pane from a window system, placing a window pane in a window system, or a combination of the two.

Thus, the advantageous embodiments provide a method and apparatus for a window system for use in a vehicle. In one advantageous embodiment, the window system may comprise a window pane, a support frame, a retention frame, and a biasing system. The window pane may be configured to contact a sealing system. The support frame may be configured to contact the sealing system and support the window pane. The retention frame may be configured to contact the sealing system and hold the window pane against the support frame. The biasing system may be configured to bias the retention frame toward the support frame while the support frame and the retention frame are in a configuration that holds the window pane. The window pane may be removed after removal of the retention frame.

Figure 1:
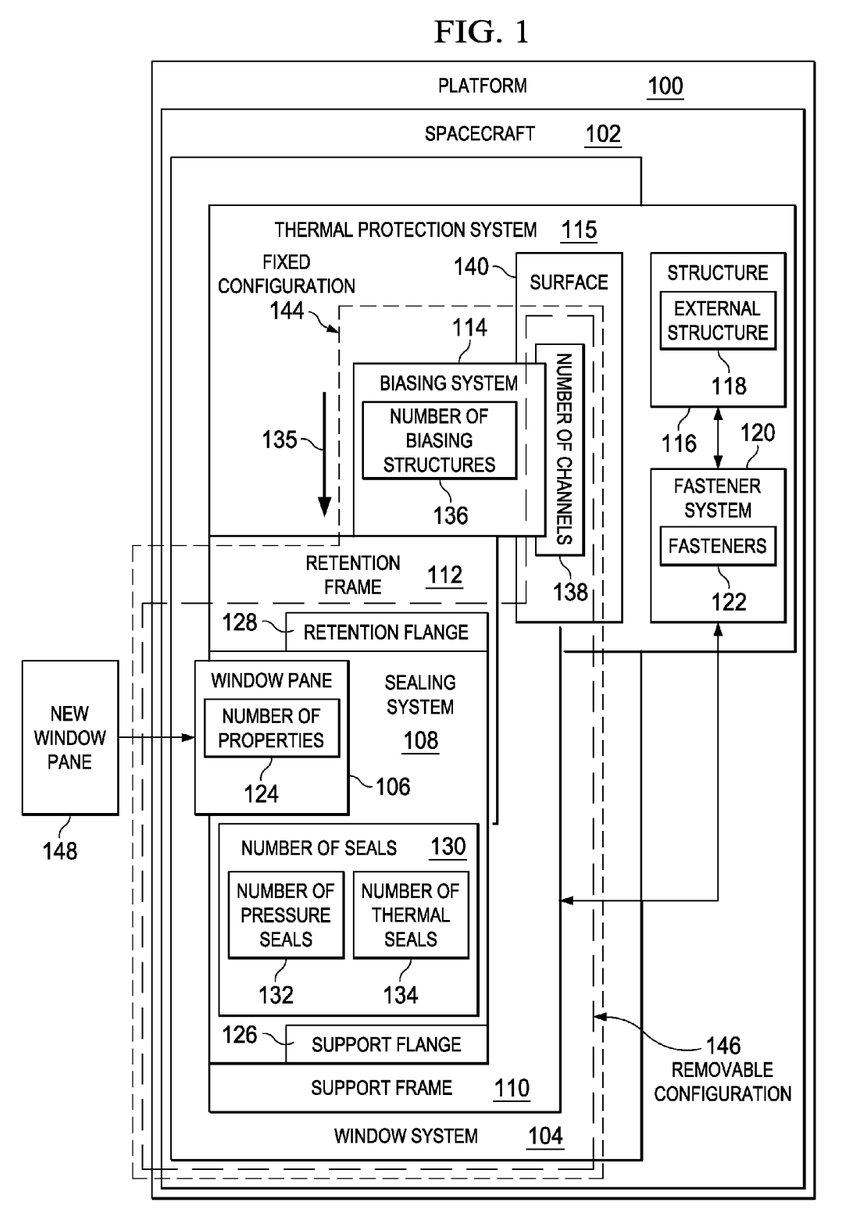
FIG. 1 is an illustration of a platform in which a window system may be implemented in accordance with an advantageous embodiment.

With reference now to the figures and, in particular, with reference now to FIG. 1, an illustration of a platform in which a window system may be implemented is depicted in accordance with an advantageous embodiment. In this illustrative example, platform 100 may be spacecraft 102. Window system 104 may be an example of a window system in spacecraft 102. In this illustrative example, window system 104 may comprise window pane 106, sealing system 108, support frame 110, retention frame 112, biasing system 114, and thermal protection system 115.

In these illustrative examples, support frame 110 may be comprised of material selected from one of a metal, a metal alloy, aluminum, titanium, a fiber reinforced composite, a ceramic composite, and/or some other suitable material. Retention frame 112 may be comprised of a material similar to that of support frame 110. The material used for retention frame 112 may be the same or different from the material used for support frame 110. As depicted, support frame 110 may be associated with structure 116. Structure 116 may be external structure 118.

When one component is "associated" with another component, the association is a physical association in these depicted examples. For example, without limitation, a first component, support frame 110, may be considered to be associated with a second component, structure 116, by being secured to the second component, bonded to the second component, mounted to the second component, welded to the second component, fastened to the second component, and/or connected to the second component in some other suitable manner. The first component also may be connected to the second component using a third component, such as fastener system 120. The first component may also be considered to be associated with the second component by being formed as part of and/or an extension of the second component.

In these illustrative examples, support frame 110 may be associated with external structure 118 through at least one of fastener system 120 and thermal protection system 115. Thermal protection system 115 may indirectly connect support frame 110 to external structure 118.

As used herein, the phrase "at least one of", when used with a list of items, means different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

In other examples, "at least one of" may be, for example, without limitation, two of item A, one of item B, and ten of item C; four of item B and seven of item C; and other suitable combinations.

In these illustrative examples, fastener system 120 may comprise fasteners 122. Removal of fasteners 122, however, may be unnecessary in removing window pane 106.

As depicted, window pane 106 may comprise a material selected from at least one of silicone, polycarbonate, and/or other suitable materials. The material may be selected based on a desired use for window pane 106.

For example, without limitation, the materials used for window pane 106 may be selected to have number of properties 124. Number of properties 124 may include the desired level of at least one of an optical clarity, thermal insulation, toughness, and/or other suitable properties. As used herein, a "number", when used with reference to items, means one or more items. For example, "number of properties 124" is one or more properties.

In the illustrative examples, window pane 106 may be held in place within window system 104 by support frame 110 and retention frame 112. In these illustrative examples, support frame 110 may have support flange 126. Support flange 126 may extend from support frame 110 and may be configured to support window pane 106. Retention frame 112 may have retention flange 128. Retention flange 128 may be configured to contact window pane 106. In these illustrative examples, the contact may be an indirect contact.

In particular, support frame 110 indirectly supports window pane 106 through sealing system 108. More specifically, sealing system 108 may be configured to contact window pane 106 and support frame 110. In particular, sealing system 108 may contact support flange 126 on support frame 110. Additionally, sealing system 108 also may be configured to contact window pane 106 and retention frame 112. Further, sealing system 108 may also contact support frame 110 and retention frame 112. More specifically, sealing system 108 may contact retention flange 128 on retention frame 112.

In these illustrative examples, window pane 106 may not directly contact support frame 110 and retention frame 112 when window pane 106 is held in place by these components in window system 104. In other words, support frame 110 and retention frame 112 may indirectly contact window pane 106 through sealing system 108.

As depicted, sealing system 108 may comprise number of seals 130. Number of seals 130 may include at least one of number of pressure seals 132 and number of thermal seals 134.

The material used for a seal in number of seals 130 may depend on whether the seal is a seal within number of pressure seals 132 or number of thermal seals 134. The material may be selected from one of an elastomeric material, rubber, silicone, or other suitable materials.

In these illustrative examples, biasing system 114 may be configured to bias retention frame 112 toward support frame 110. In particular, biasing system 114 may bias retention flange 128 toward support flange 126 in the direction of arrow 135 with window pane 106 being located between the flanges.

In the illustrative examples, biasing system 114 may be number of biasing structures 136. A biasing structure in number of biasing structures 136 may take different forms. For example, without limitation, a biasing structure may be a spring, an elastic material, or some other suitable component.

Number of biasing structures 136 may engage support frame 110. In particular, number of biasing structures 136 may be placed into number of channels 138 in surface 140 of support frame 110. In these illustrative examples, thermal protection system 115 may cover at least one of retention frame 112 and external structure 118. Thermal protection system 115 may protect other components in window system 104 from heat that may result from operation of spacecraft 102.

When window pane 106 is located between support flange 126 and retention flange 128 with number of biasing structures 136 engaged in number of channels 138, window system 104 may be in fixed configuration 144.

In particular, retention flange 128 may not be removable in a manner that allows for removal of window pane 106. As a result, window pane 106 may be held in place within window system 104 by retention flange 128 on retention frame 112 and by support flange 126 on support frame 110.

When number of biasing structures 136 is removed from number of channels 138, window system 104 may be in removable configuration 146. When in removable configuration 146, retention frame 112 may be moved in a manner that allows window pane 106 to be removed from window system 104. In particular, retention flange 128 may be moved away from support flange 126 such that window pane 106 may be removed from window system 104.

Window pane 106 may then be reworked or replaced by new window pane 148. These operations with respect to window pane 106 may be performed without the time and effort involved in removing fasteners. In these illustrative examples, removal of fasteners 122 may not be needed to remove window pane 106 from window system 104.

In this manner, removing window pane 106 for any reason may be performed more quickly as compared to currently available window systems. Removal of large numbers of fasteners may be unnecessary to remove window pane 106. Further, if window pane 106 is replaced with new window pane 148, installation of new window pane 148 may be performed without installing fasteners in fastener system 120.

For example, without limitation, fasteners 122 in fastener system 120 may be about 60 fasteners. If removal of the 60 fasteners is needed to remove window pane 106, the amount of time may be greater than removing number of biasing structures 136 from number of channels 138. In one illustrative example, two biasing structures may be present in number of biasing structures 136 that fit into one channel in number of channels 138. The time needed to remove these two biasing structures in number of biasing structures 136 from one channel in number of channels 138 may be less than the time required to remove all 60 fasteners.

The illustration of window system 104 in platform 100 in FIG. 1 is not meant to imply physical or architectural limitations to the manner in which an advantageous embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an advantageous embodiment.

For example, in other illustrative examples, platform 100 may have a number of additional window systems in addition to window system 104. Further, platform 100 may take other forms other than spacecraft 102. Platform 100 may be, for example, without limitation, a mobile platform, a stationary platform, a land-based structure, an aquatic-based structure, a space-based structure, or some other suitable type of platform. More specifically, an advantageous embodiment may be applied to, for example, without limitation, a vehicle, an aircraft, a space capsule, a space shuttle, a submarine, or some other suitable platform.

As yet another illustrative example, although support frame 110 is depicted as being connected to structure 116 in the form of external structure 118, support frame 110 may be connected to other structures. For example, structure 116 may be an internal structure. Support frame 110 may be connected to an internal structure because removal of fastener system 120 and support frame 110 may not be needed to replace window pane 106. In yet another illustrative example, another type of system other than thermal protection system 115 may be used. For example, without limitation, a metal cover, or some other suitable structure may be used in place of and/or in addition to thermal protection system 115.

Figure 2:
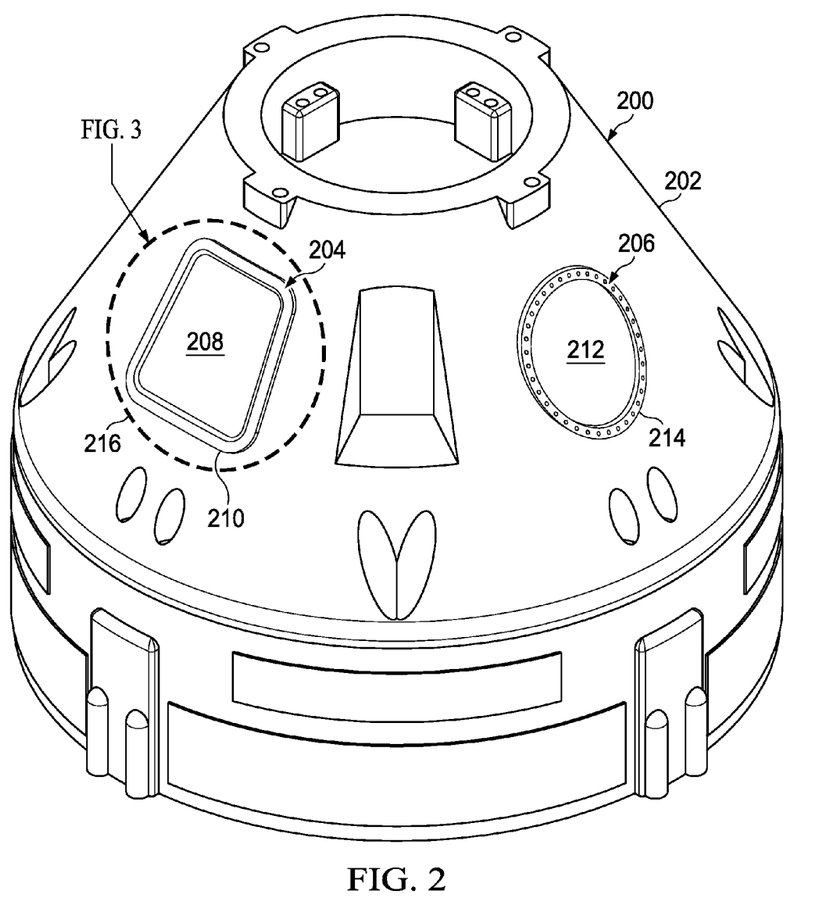
FIG. 2 is an illustration of a spacecraft in accordance with an advantageous embodiment.

With reference now to FIG. 2, an illustration of a spacecraft is depicted in accordance with an advantageous embodiment. In this illustrative example, spacecraft 200 is an example of an implementation for spacecraft 102 in FIG. 1. Spacecraft 200 is shown in a perspective view. In this example, spacecraft 200 may be capsule 202. Spacecraft 200 may have window system 204 and window system 206. In this illustrative example, window pane 208 may have trapezoidal shape 210, while window pane 212 may have circular shape 214. Of course, window pane 208 may have other shapes. For example, without limitation, window pane 212 may be an oval, a square, a hexagon, or some other suitable shape. A more-detailed view of window system 204 in section 216 may be seen in FIG. 3.

Figure 3:
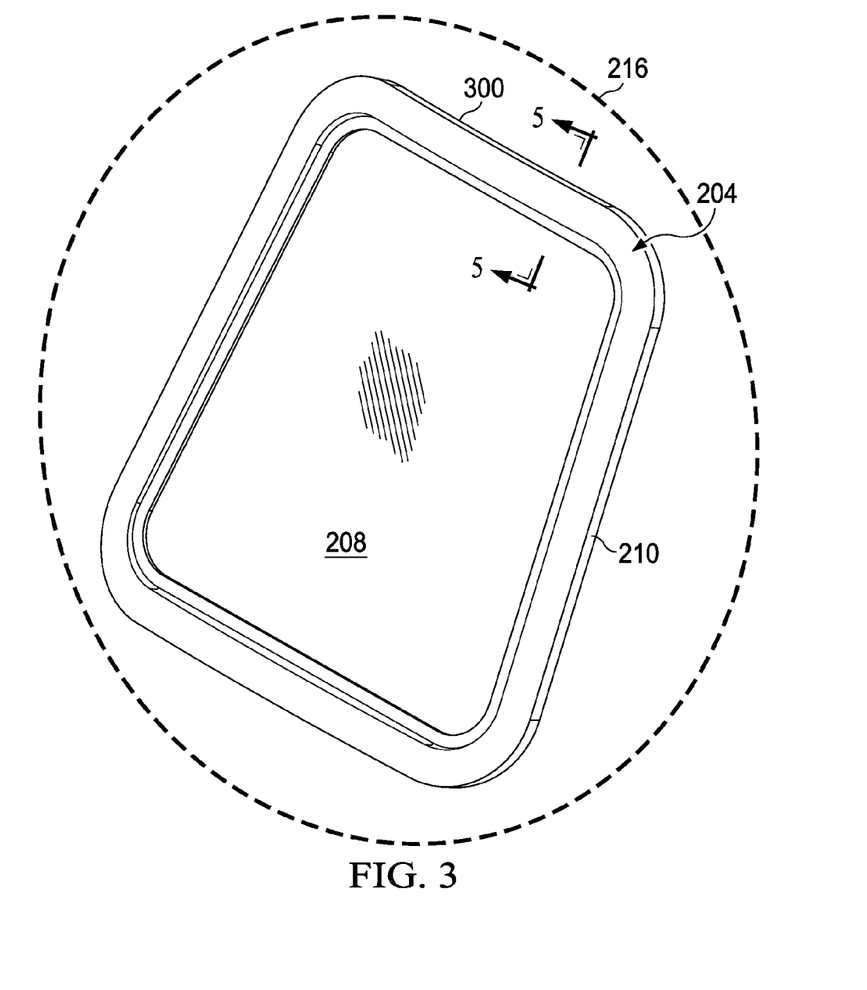
FIG. 3 is an illustration of a window system in accordance with an advantageous embodiment.

With reference now to FIG. 3, an illustration of a window system is depicted in accordance with an advantageous embodiment. In this illustrative example, a more-detailed view of window system 204 in section 216 from FIG. 2 is depicted. In this illustrative example, thermal protection system 300 in window system 204 covers different components of window system 204 other than window pane 208. Thermal protection system 300 may be removed to perform maintenance operations on window pane 208.

Figure 4:
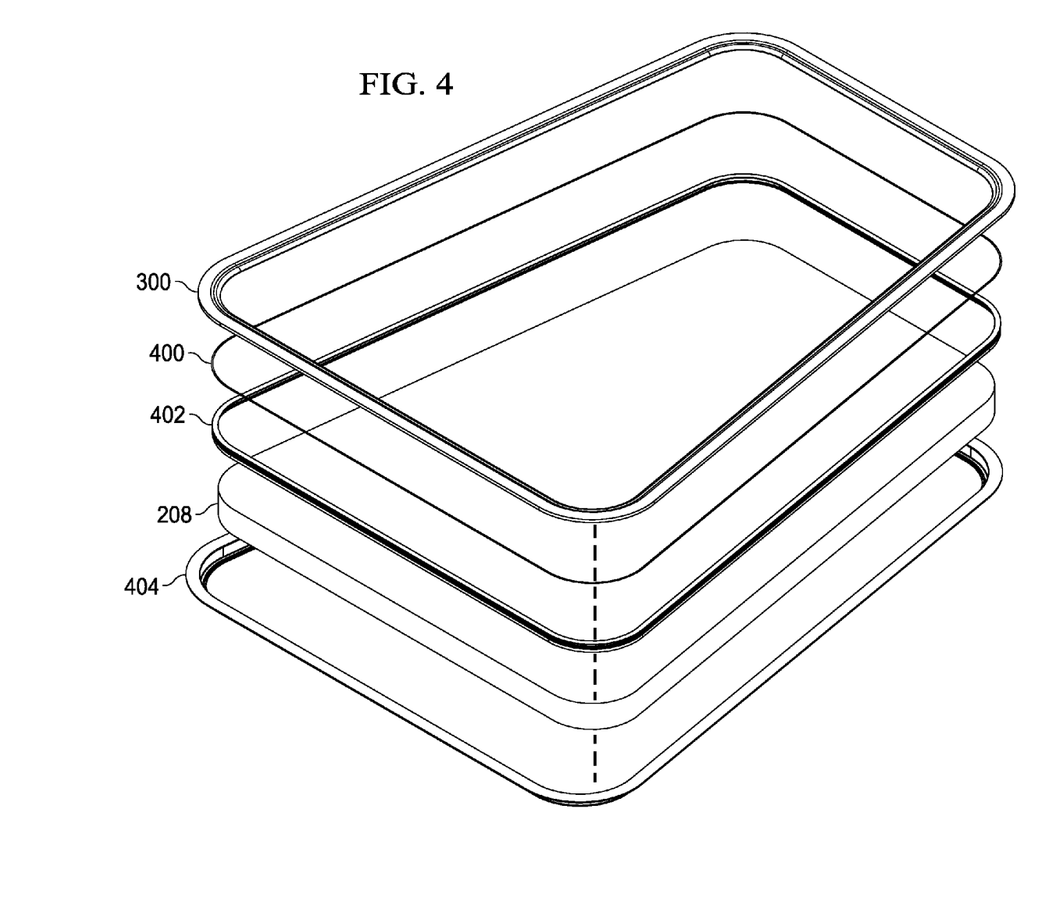
FIG. 4 is an illustration of an exploded view of a window system in accordance with an advantageous embodiment.

With reference now to FIG. 4, an exploded view of a window system is depicted in accordance with an advantageous embodiment. In this illustrative example, an exploded view of window system 204 is depicted. In this exploded view, window system 204 may comprise thermal protection system 300, biasing system 400, retention frame 402, window pane 208, and support frame 404. Further, window system 204 may also include a fastener system and a sealing system, which are not shown in this view. In this illustrative example, these components may be connected to an external structure (not shown).

Figure 5:
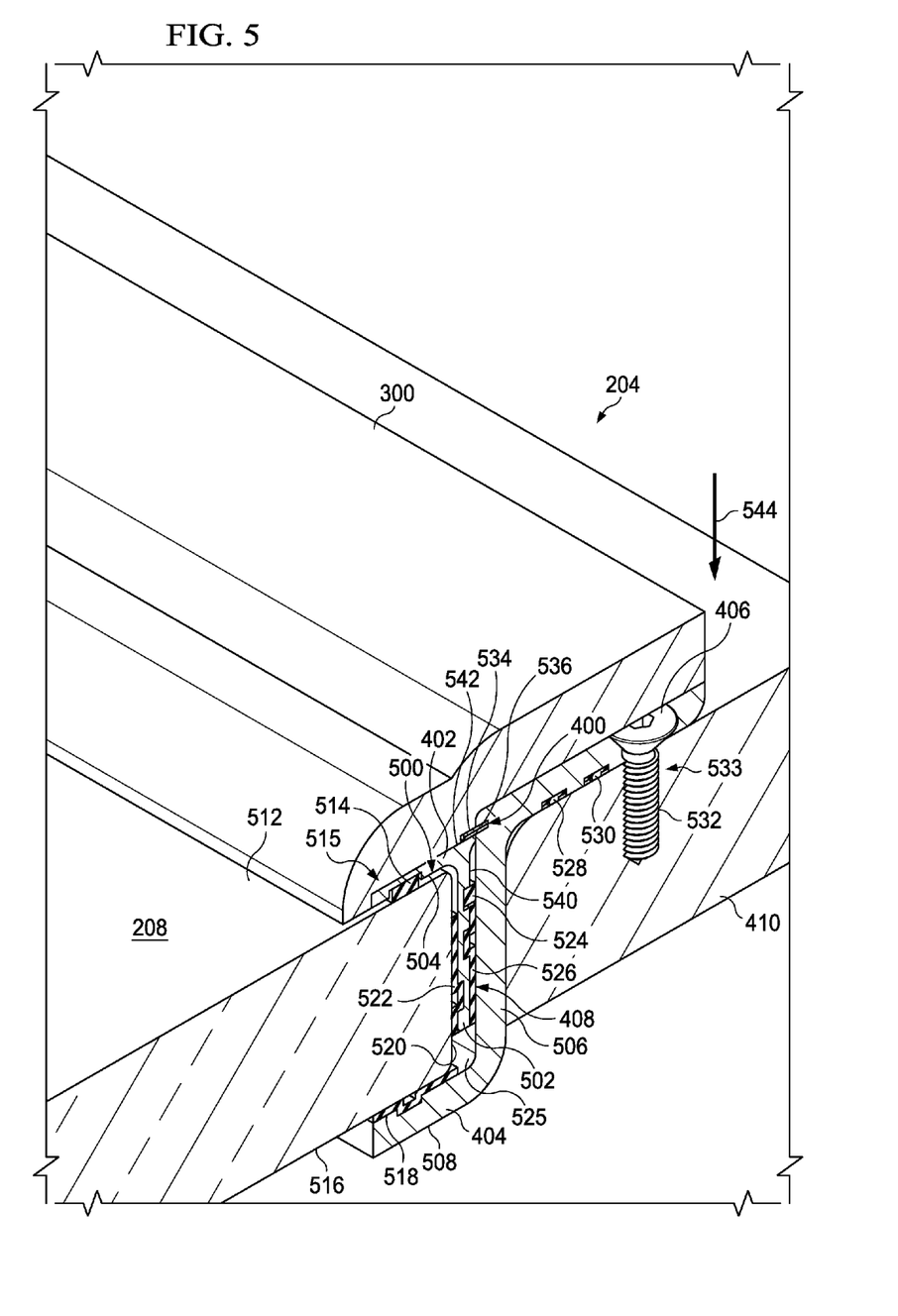
FIG. 5 is an illustration of a cross-sectional view of a window system in accordance with an advantageous embodiment.

With reference now to FIG. 5, an illustration of a cross-sectional view of a window system is depicted in accordance with an advantageous embodiment. As depicted, a cross-sectional view of window system 204 taken along lines 5-5 in FIG. 3 is shown.

As depicted, retention frame 402 has L-shape 500. In particular, retention frame 402 has base 502 with flange 504 extended substantially perpendicular from base 502. In this illustrative example, support frame 404 has base 506 and flange 508. Flange 504 and flange 508 may be substantially parallel to each other in this depicted example. As illustrated, window pane 208 may be located between flange 504 of retention frame 402 and flange 508 of support frame 404.

In this illustrative example, surface 512 of window pane 208 contacts seal 514 in sealing system 515. As depicted, seal 514 may be a thermal seal. Surface 516 of window pane 208 contacts seal 518 in sealing system 515. In these illustrative examples, seal 518 may be a pressure seal. In particular, seal 518 may be a redundant pressure seal. Surface 520 of window pane 208 may contact seal 522 in sealing system 515. Seal 522 may be a pressure seal in these illustrative examples.

In turn, seal 514 and seal 522 may contact surface 540 of retention frame 402. In a similar fashion, seal 518 may contact surface 525 of support frame 404.

In this illustrative example, seal 524 and seal 526 in sealing system 515 may be located between retention frame 402 and support frame 404. Seal 524 may be a thermal seal, and seal 526 may be a pressure seal.

In these illustrative examples, seal 528 and seal 530 may be located between support frame 404 and external structure 410. Seal 530 may be a pressure seal, and seal 528 may be a redundant pressure seal for seal 530. In this illustrative example, support frame 404 may be connected to external structure 410 through fasteners, such as fastener 532, in fastener system 533.

As illustrated, number of springs 534 in biasing system 400 may be engaged with support frame 404. In these illustrative examples, number of springs 534 may be two springs. In other illustrative examples, number of springs 534 may be some other number of springs. In still other advantageous embodiments, biasing system 400 may only include a single spring, depending on the particular implementation.

As depicted, a portion of number of springs 534 may be located in channel 536 in surface 540 of support frame 404. In this illustrative example, number of springs 534 also contacts surface 542 of retention frame 402. In particular, number of springs 534 may contact surface 542 on flange 504 of retention frame 402. Number of springs 534 may be comprised of titanium, steel, a steel alloy, and other suitable materials.

In this illustrative example, number of springs 534 applies a force in direction 544. This force may cause flange 504 to move toward flange 508 in direction 544 with window pane 208 in between these flanges. This configuration may hold window pane 208 in place within window system 204.

Figure 6:
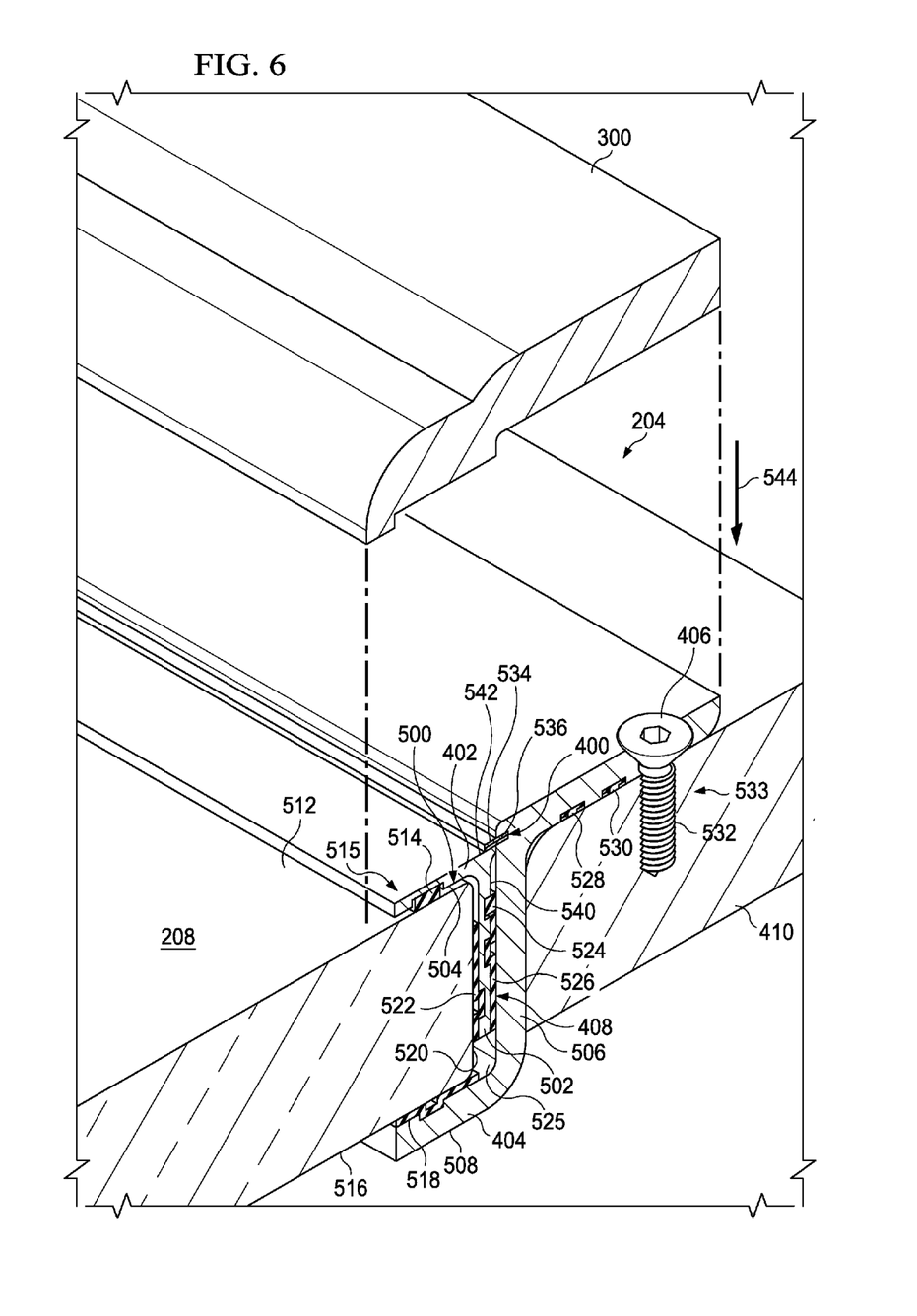
FIG. 6 is an illustration of a portion of a window system in accordance with an advantageous embodiment.
Figure 7:
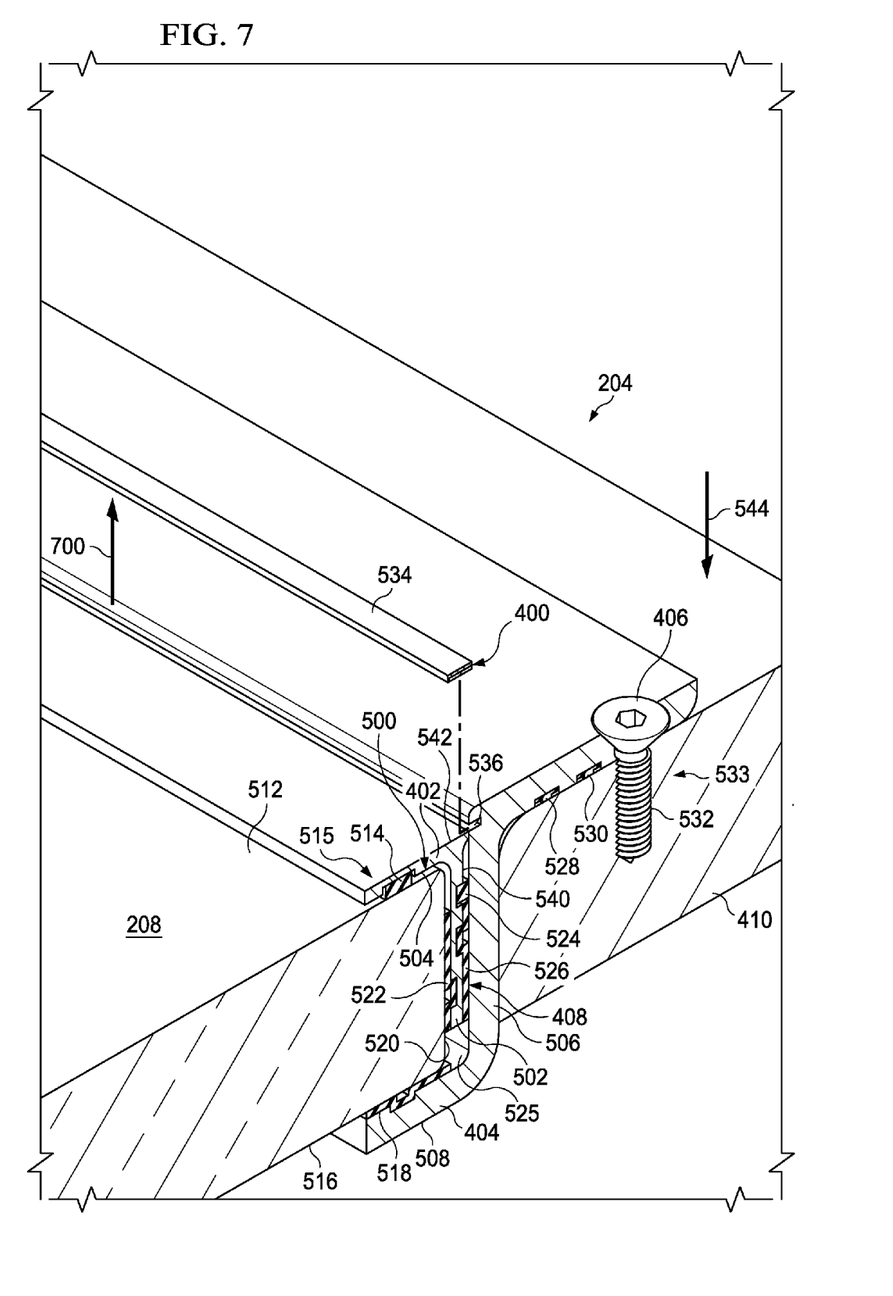
FIG. 7 is another illustration of a portion of a window system in accordance with an advantageous embodiment.
Figure 8:
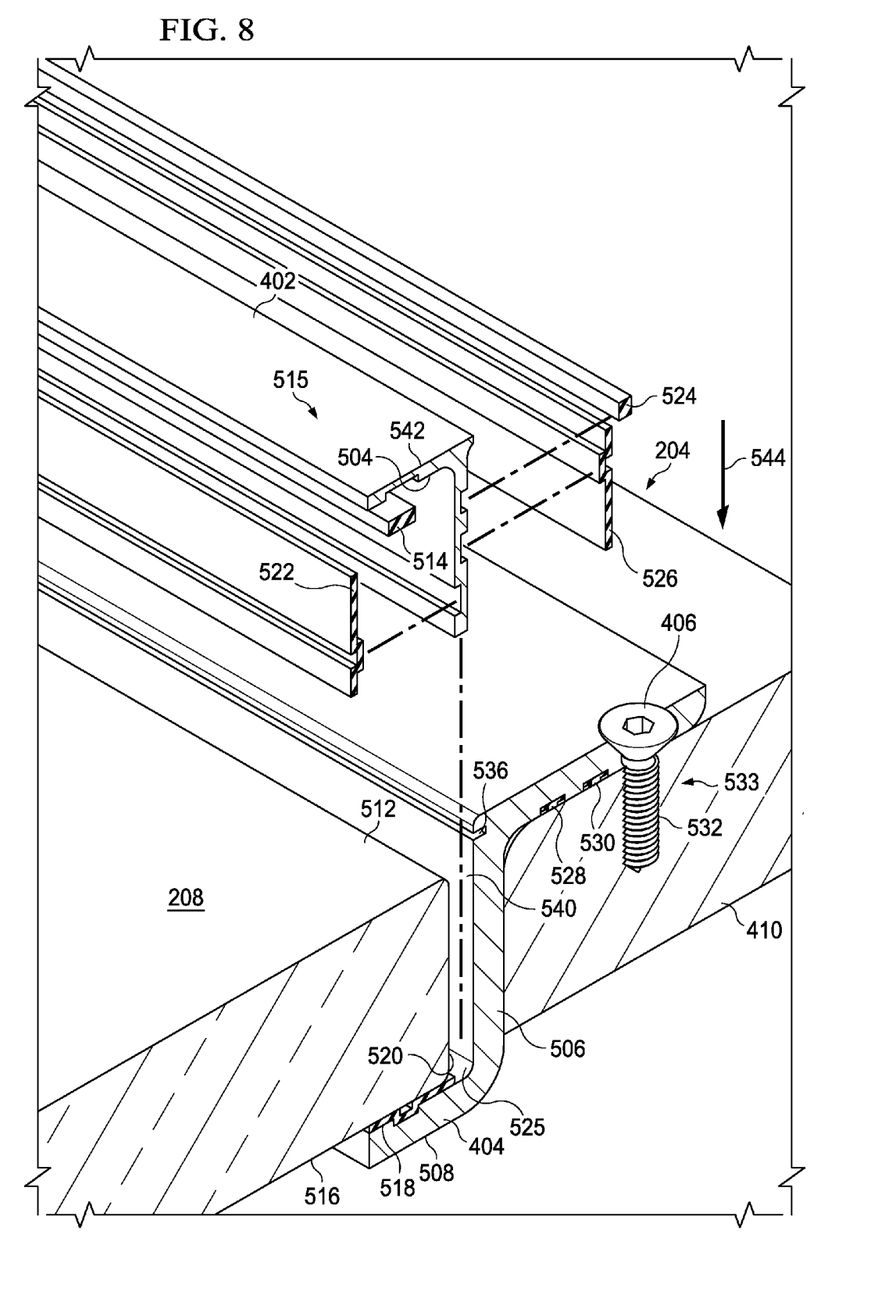
FIG. 8 is another illustration of a portion of a window system in accordance with an advantageous embodiment.

In FIGS. 6-8, an illustration of components removed to access window pane 208 is depicted in accordance with an advantageous embodiment. Turning first to FIG. 6, an illustration of a portion of a window system is depicted in accordance with an advantageous embodiment. In this illustrative example, thermal protection system 300 is shown as removed from around window system 204. When thermal protection system 300 is removed, number of springs 534 may be accessed as part of a process to gain access to window pane 208. Thermal protection system 300 may be attached to spacecraft 200 in a number of different ways. For example, thermal protection system 300 may be attached using fasteners, adhesive, and/or other suitable attachment mechanisms.

Turning next to FIG. 7, an illustration of a portion of a window system is depicted in accordance with an advantageous embodiment. In this example, number of springs 534 has been removed from channel 536. With number of springs 534 removed from channel 536, retention frame 402 may no longer be biased in direction 544.

As a result, retention frame 402 may be moved in the direction of arrow 700. Moving retention frame 402 in the direction of arrow 700 may disengage retention frame 402 from holding window pane 208 in place in window system 204.

In FIG. 8, an illustration of a portion of a window system is depicted in accordance with an advantageous embodiment. As depicted, retention frame 402 has been removed along with seals 514, 522, 524, and 526. With these components removed, window pane 208 may be removed. This removal of window pane 208 may be performed without removing fasteners, such as fastener 532. In this manner, easier removal of window pane 208 may be performed by removing number of springs 534 (not shown) rather than fasteners in fastener system 533.

The different components shown in FIGS. 2-8 may be combined with components in FIG. 1, used with components in FIG. 1, or a combination of the two. Additionally, some of the components illustrated in FIGS. 2-8 may be illustrative examples of how components shown in block form in FIG. 1 can be implemented as physical structures.

Figure 9:
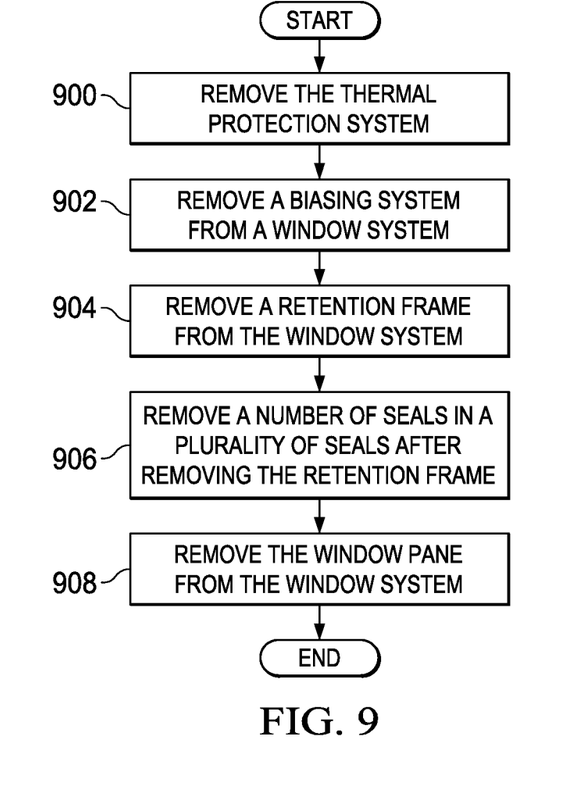
FIG. 9 is an illustration of a flowchart of a process for manipulating components in a window system in accordance with an advantageous embodiment.

With reference now to FIG. 9, an illustration of a flowchart of a process for manipulating components in a window system is depicted in accordance with an advantageous embodiment. This process may be implemented with window system 104 in FIG. 1.

The process may begin by removing thermal protection system 115 from window system 104 (operation 900). Biasing system 114 may then be removed from window system 104 (operation 902). Thereafter, retention frame 112 may be removed from window system 104 (operation 904). A number of seals in number of seals 130 may be removed after removing retention frame 112 (operation 906). The number of seals may be pressure seals, thermal seals, or some combination thereof. Thereafter, window pane 106 may be removed from window system 104 (operation 908), with the process terminating thereafter.

The different operations illustrated in FIG. 1 may be performed in reverse order to secure a window pane in window system 104. In these illustrative examples, these operations may be performed to install new window pane 148.

Thus, the different advantageous embodiments provide a method and apparatus for a window system on a platform. In these illustrative examples, the platform may be a spacecraft with a window system, such as window system 104. Assembly and disassembly may be performed more easily and more quickly as compared to currently used window systems. Window pane 106 may be accessed by removing biasing system 114 and retention frame 112. This removal of components may be performed without removing fasteners 122 in fastener system 120. In this manner, the time, cost, or both for replacing window panes on a space vehicle may be reduced.

Figure 10:
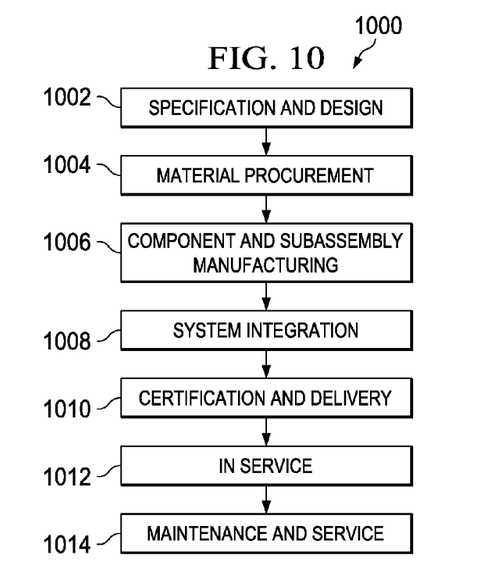
FIG. 10 is an illustration of a platform manufacturing and service method in accordance with an advantageous embodiment.
Figure 11:
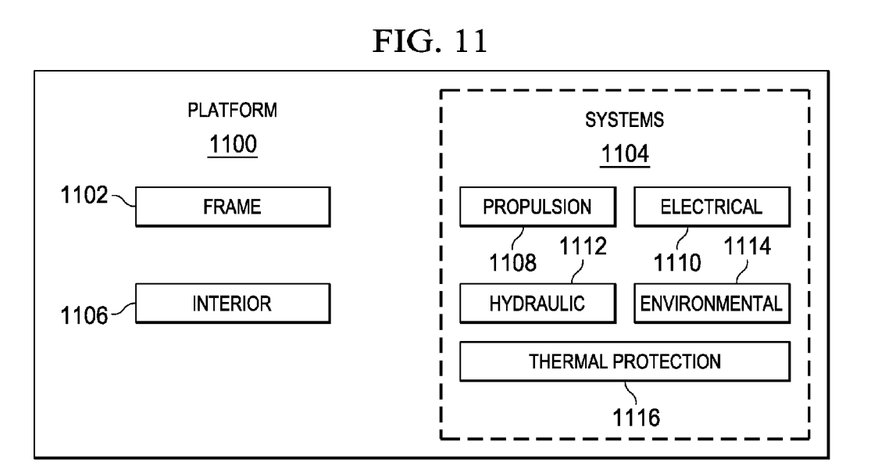
FIG. 11 is an illustration of a platform in which an advantageous embodiment may be implemented.

Advantageous embodiments of the disclosure may be described in the context of platform manufacturing and service method 1000 as shown in FIG. 10 and platform 1100 as shown in FIG. 11. Turning first to FIG. 10, an illustration of a platform manufacturing and service method is depicted in accordance with an advantageous embodiment. During pre-production, platform manufacturing and service method 1000 may include specification and design 1002 of platform 1100 in FIG. 11 and material procurement 1004.

During production, component and subassembly manufacturing 1006 and system integration 1008 of platform 1100 in FIG. 11 may take place. Thereafter, platform 1100 in FIG. 11 may go through certification and delivery 1010 in order to be placed in service 1012. While in service 1012 by a customer, platform 1100 in FIG. 11 may be scheduled for routine maintenance and service 1014, which may include modification, reconfiguration, refurbishment, and other maintenance or service.

Each of the processes of platform manufacturing and service method 1000 may be performed or carried out by a system integrator, a third party, and/or an operator. In these examples, the operator may be a customer. For the purposes of this description, a system integrator may include, without limitation, any number of spacecraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of a platform is depicted in which an advantageous embodiment may be implemented. In this illustrative example, platform 1100 may be produced by platform manufacturing and service method 1000 in FIG. 10. Platform 1100 may include frame 1102 with a plurality of systems 1104 and interior 1106. Examples of plurality of systems 1104 may include one or more of propulsion system 1108, electrical system 1110, hydraulic system 1112, environmental system 1114, and thermal protection system 1116.

Although an aerospace example is shown, different advantageous embodiments may be applied to various industries, such as the spacecraft industry, the aircraft industry, the automotive industry, the ship industry, and/or other suitable industries. Platform 1100 may also take various forms. For example, without limitation, platform 1100 may be selected from one of a mobile platform, a stationary platform, a land-based structure, an aquatic-based structure, a space-based structure, a vehicle, an aircraft, a space capsule, a space shuttle, a submarine, and other suitable types of platforms.

Apparatuses and methods embodied herein may be employed during at least one of the stages of spacecraft manufacturing and service method 1000 in FIG. 10. In one illustrative example, components or subassemblies produced in component and subassembly manufacturing 1006 in FIG. 10 may be fabricated or manufactured in a manner similar to components or subassemblies produced while platform 1100 is in service 1012 in FIG. 10.

As yet another example, a number of apparatus embodiments, method embodiments, or a combination thereof may be utilized during production stages, such as component and subassembly manufacturing 1006 and system integration 1008 in FIG. 10. A number, when referring to items, means one or more items. For example, a number of apparatus embodiments is one or more apparatus embodiments. A number of apparatus embodiments, method embodiments, or a combination thereof may be utilized while spacecraft 1100 is in service 1012 and/or during maintenance and service 1014 in FIG. 10. The use of a number of the different advantageous embodiments may substantially expedite the assembly of and/or reduce the cost of platform 1100.

In particular, at least one of a method and apparatus for an advantageous embodiment may be implemented for a window system in platform 1100. With a window system, such as window system 104, removal and installation of window panes may be performed more quickly, for less cost, or some combination thereof.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A window system for a platform, the window system comprising:
  a window pane configured to contact a sealing system;
  a retention frame configured to contact the sealing system and hold the window pane against a support frame; and
  a biasing system configured to bias the retention frame toward the support frame while the support frame and the retention frame are in a configuration that holds the window pane, and removal of the biasing system causes the retention frame and the window pane to be removable;
  wherein a first portion of the biasing system is configured to contact the retention frame and a second portion of the biasing system is configured to engage a channel in the support frame.

2. The window system of claim 1, wherein the support frame is configured to contact the sealing system and support the window pane.

3. The window system of claim 1, wherein the sealing system is in contact with the window pane, the support frame, and the retention frame and forms a seal for the window pane.

4. The window system of claim 3, wherein the support frame is connected to a structure by at least one of a fastener system or a thermal protection system.

5. The window system of claim 3, wherein the support frame is connected to a thermal protection system.

6. The window system of claim 1, wherein the retention frame has an L-shape.

7. The window system of claim 1, wherein the retention frame comprises:
- a base; and
- a flange extending from the base, wherein the flange contacts the sealing system.

8. The window system of claim 1, wherein the biasing system is a number of springs.

9. The window system of claim 8, wherein a first portion of the number of springs is configured to contact the retention frame and a second portion of the number of springs is configured to engage the channel in the support frame.

10. The window system of claim 1, wherein the sealing system comprises:
- a number of seals.

11. The window system of claim 1, wherein the sealing system comprises at least one of a thermal seal or a pressure seal located between the window pane and the retention frame.

12. The window system of claim 1, wherein the platform is selected from one of a mobile platform, a stationary platform, a land-based structure, an aquatic-based structure, a space-based structure, a vehicle, an aircraft, a space capsule, a space shuttle, or a submarine.

13. A window system for a spacecraft, the window system comprising:
- a sealing system in which a number of seals comprises at least one of a number of thermal seals or a number of pressure seals;
- a window pane to contact the sealing system;
- a support frame configured to contact the sealing system and support the window pane;
- a retention frame having an L-shape with a base and a flange that extends from the base in which the retention frame is configured to contact the sealing system and hold the window pane against the support frame; in which the sealing system comprises at least one of the number of thermal seals and the number of pressure seals is located between the window pane and the retention frame; and in which the sealing system is in contact with the window pane, the support frame, and the flange of the retention frame and forms a seal for the window pane;
- a number of springs in a biasing system configured to bias the retention frame toward the support frame while the support frame and the retention frame are in a configuration that holds the window pane in which a first portion of the number of springs is configured to contact the retention frame and a second portion of the number of springs is configured to engage a channel in the support frame and in which removal of the biasing system causes the retention frame and the window pane to be removable; and
- a structure for the spacecraft, wherein the support frame is connected to the structure by a fastener system.

14. A window system for a platform, the window system comprising:
- a window pane configured to contact a sealing system;
- a retention frame configured to contact the sealing system and hold the window pane against a support frame; and
- a biasing system configured to bias the retention frame toward the support frame while the support frame and the retention frame are in a configuration that holds the window pane, and removal of the biasing system causes the retention frame and the window pane to be removable;
- wherein a first portion of the biasing system is configured to contact the retention frame and a second portion of the biasing system is configured to engage a channel in the support frame; and
- wherein the retention frame has an L-shape.

* * * * *